No. 806,782. PATENTED DEC. 12, 1905.
G. A. DAMON.
MAGNETIC CLUTCH.
APPLICATION FILED FEB. 21, 1903. RENEWED DEC. 7, 1903.
2 SHEETS—SHEET 1.
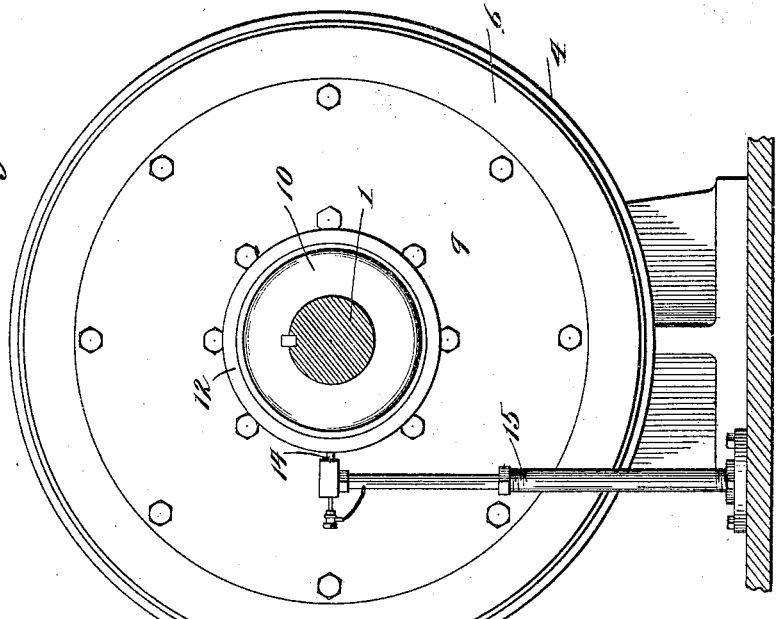
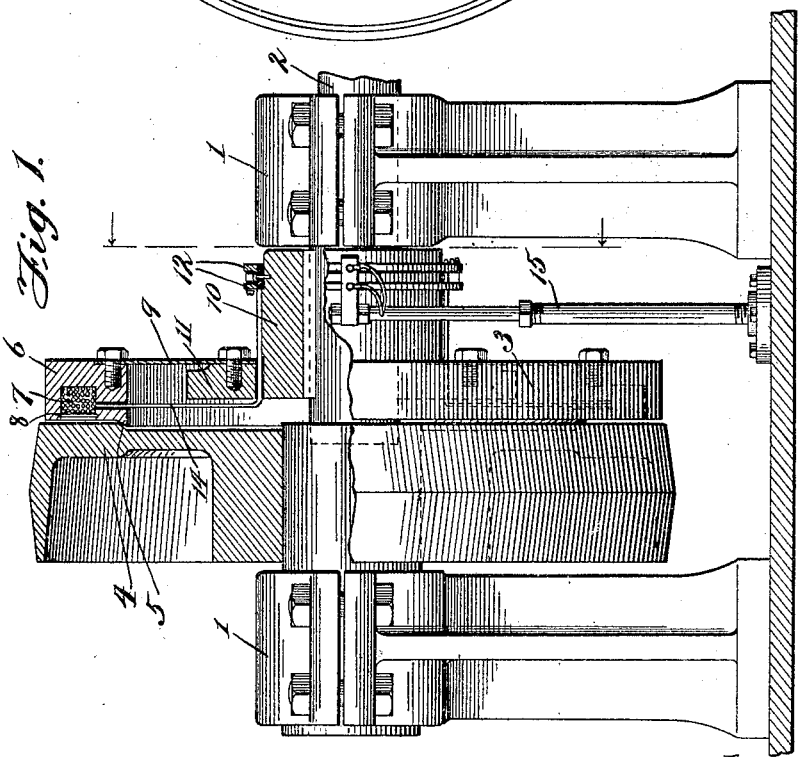
Witnesses:
Ira D. Perry
J. B. Weir
Inventor:
George A. Damon
By Jones & Addington
Attys.

No. 806,782. PATENTED DEC. 12, 1905.
G. A. DAMON.
MAGNETIC CLUTCH.
APPLICATION FILED FEB. 21, 1903. RENEWED DEC. 7, 1903.
2 SHEETS—SHEET 2.
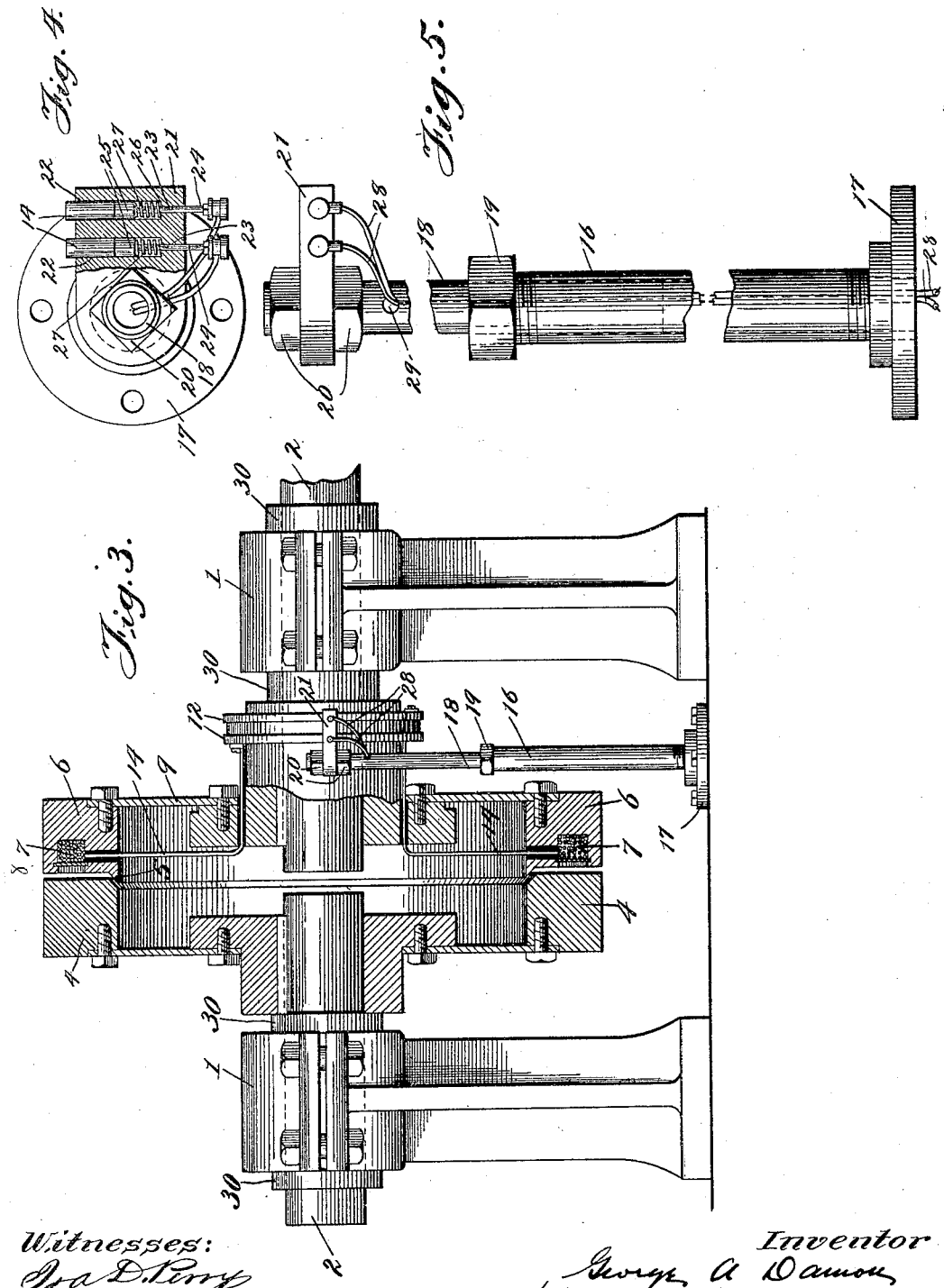
Witnesses:
Ira D. Perry
J. B. Weir
Inventor
George A. Damon
By Jones & Addington
Attys.

UNITED STATES PATENT OFFICE.

GEORGE A. DAMON, OF CHICAGO, ILLINOIS, ASSIGNOR TO THE ARNOLD MAGNETIC CLUTCH COMPANY, OF MILWAUKEE, WISCONSIN, A CORPORATION OF WISCONSIN.

MAGNETIC CLUTCH.

No. 806,782.      Specification of Letters Patent.      Patented Dec. 12, 1905.

Application filed February 21, 1903. Renewed December 7, 1903. Serial No. 184,229.

*To all whom it may concern:*

Be it known that I, GEORGE A. DAMON, a citizen of the United States, residing at Chicago, in the county of Cook and State of Illinois, have invented a certain new and useful Improvement in Magnetic Clutches, of which the following is a full, clear, concise, and exact description, reference being had to the accompanying drawings, forming a part of this specification.

My invention relates to improvements in magnetic clutches. Heretofore in devices of this character if one of the members should be set or accidentally sprung so that its meeting face was out of alinement with the face of the opposing member, but a portion of the two meeting faces would be in contact, and therefore an undue strain would be produced upon the parts and the clutch would not efficiently perform its work and slippage would result. This is very likely to occur in clutches which have their members mounted upon the opposing ends of separate shafts which have their axes alining. To overcome this disadvantage and oftentimes vital defect is one of the objects of the present invention. Another disadvantage which often occurs in magnetic clutches is the tendency which the members have to remain clutched after the magnet has been deënergized, owing to the residual magnetism within the members. Therefore a further object of my invention is to instantly release the members when the energizing-coil is deënergized.

In the accompanying drawings, illustrating the preferred embodiments of my invention, Figure 1 is an elevation, partly in section, of a clutch mechanism embodying my improvements, in which the members of the clutch are mounted upon shafts having an end thrust. Fig. 2 is an end elevation of the device illustrated in Fig. 1. Fig. 3 is a view showing the clutch members in section, in which the shafts are retained in their relative positions by collars. Fig. 4 is a plan view of my brush-holder, and Fig. 5 is an elevation of the standard and brush-holder.

Referring to the drawings, which show one way of carrying out my invention, alining bearings 1 1 are mounted upon a suitable base. A shaft 2 is journaled in each of said bearings, and said shafts preferably have an end thrust, whereby each is retained in its relative position in its bearings. Upon the abutting end of one shaft is mounted a magnet member 3, and upon the opposing end of the other shaft is supported an armature 4. The meeting faces of said members are shaped to conform to each other, and said faces preferably have annular beveled portions 5 concentric with the common axis of the shaft. One of said faces is oppositely beveled to the other to cause said members to center themselves when brought together.

The magnet member consists, preferably, of a ring 6, having in its meeting face an annular channel or groove containing the magnet-coil 7. A cover 8, preferably of a sheet of thin copper, fits within said groove to cover the magnet-coil. This ring is connected to a yielding support, preferably consisting of a spring metallic disk 9 bolted thereto and having a central opening to receive a hub 10, keyed to the shaft and provided with a peripheral flange 11, to which said disk 9 is also bolted. The hub 10 carries collecting-rings 12, suitably insulated therefrom and from each other and which are respectively connected with opposite ends of the magnet-coil by conductors 14, which are insulated from the other parts.

The two members are so arranged with relation to each other that their meeting faces are normally spaced apart. When the magnet is energized, the spring-metal support will give sufficiently to allow the faces of the two members to come together. The tension thus brought upon the spring-disk will cause the members to instantly be released from each other and the magnet member to be returned to its normal position when the magnet is deënergized.

The armature member is keyed to its shaft and has its periphery adapted as a pulley for either conveying or receiving power, and if it is desired to convey power by said pulley then the shaft to which the magnet member is secured is connected with any suitable driving mechanism.

The current is supplied for the magnet-coil by brushes 14, connected with a source of supply and engaging the collecting-rings 12. A suitable adjustable standard 15 for supporting said brushes is illustrated in detail in Figs. 4 and 5. It consists of a lower tubular section 16, provided with a base 17. An upper tubular section 18 is adapted to slide within said lower section, and a nut 19 is provided to clamp said upper section at any desired position. Secured between nuts 20 20, near the top of the upper section, is an arm 21 to support the brushes 14, which are placed in holes 22 22 in said arm. Communicating with holes 22 22 are smaller holes 23 23, in which are slidably mounted rods 24 24, each having a head 25. Slipped up on each rod, between the head 25 and a shoulder 26 at the base of each hole 22, is a coil-spring 27 to normally cause said rods to press the brushes outwardly to keep them in constant contact with the collecting-rings. Said rods also serve to electrically connect the brushes with the supply-wires 28 28, which are preferably arranged in the tubular support and have their ends brought out through an aperture 29 in the upper section and respectively connected with the rods 24 24 in any desirable manner.

In Fig. 3 is shown a modification of my preferred construction particularly adapted for transmitting power directly from one shaft to another. The shafts carrying the clutch members have not an end thrust, but are separated one from the other and are held in their respective positions by collars 30, secured to the shafts and arranged upon opposite sides of each of the bearings 1. The magnet member is the same as in my preferred construction, and the armature consists of a ring somewhat similar to the magnet-ring and is supported in a like manner upon a spring-disk bolted to a hub which is secured upon its shaft.

The yielding spring-support which I have provided adapts the corresponding meeting faces to conform to each other even though out of alinement, so that if the faces strike at one edge the yielding support will give until all parts of the meeting faces have come in contact. The spring action exerted by the yielding support upon its supported member when the device is clutched causes the members to be instantly released when the magnet is deënergized. The members are centered when brought together by the beveled concentric portions of their faces, and said portions also serve to prevent any great lateral displacement of the members.

It is to be understood that I do not limit myself to the construction herein shown and described, as it is only one way of embodying my invention in a practical device. The members may be mounted differently than herein set forth. It is a matter of little consequence which is the driven and which is the driving member, as they may be arranged to suit the circumstances, and either one or both members may have the yielding support. Therefore I reserve the right to make such modifications as fairly fall within the scope of my invention.

Having described my invention, what I claim as new, and desire to secure by Letters Patent, is—

1. In a magnetic clutch, the combination with coacting members, of a yielding support for at least one of said members arranged to permit other than a right-line movement of one of said members in approaching the other member, substantially as described.

2. In a magnetic clutch, the combination with an armature member, of a magnet member, and a yielding spring-support for at least one of said members arranged to permit other than a right-line movement of one of said members in approaching the other member, substantially as described.

3. A magnetic clutch comprising coacting members having suitable meeting faces and one or both of said members having a yielding support arranged to permit the opposing faces of the said clutch members to conform to each other, substantially as described.

4. A magnetic clutch comprising coacting members having suitable meeting faces, and a yielding support for at least one of said members arranged to permit the faces of said members to conform to each other, substantially as described.

5. A magnetic clutch, comprising coacting members, having suitable meeting faces and a yielding spring-support for at least one of said members arranged to permit the said opposing faces to conform to each other, said members being mounted with their opposing faces normally a slight distance apart whereby when the energizing-coil is deënergized the members will be quickly released by the tension of said spring-support, substantially as described.

6. In a magnetic clutch, the combination with coacting members having corresponding meeting faces with portions thereof so formed as to cause said members to center themselves when clutched, of a yielding support for at least one of said members arranged to permit the opposing faces of said members to conform to each other, substantially as described.

7. In a magnetic clutch, the combination with coacting members having corresponding meeting surfaces, concentric portions of which are beveled to cause said parts to center themselves when clutched, and a yielding support for at least one of said members arranged to permit the opposing faces of said members to conform to each other, substantially as described.

8. In a magnetic clutch, the combination of a magnet member and an armature member, said members having corresponding meeting surfaces concentric portions of which are beveled to cause said parts to center themselves when brought together and to prevent lateral displacement of the parts, and a yielding support for one of said members, arranged to permit the abutting faces of the members to conform to each other when the members are clutched, substantially as described.

9. In a magnetic clutch, the combination with suitable shafts, of an armature member mounted upon one of said shafts, an opposing magnet member mounted upon the other shaft, said members having suitable meeting faces and at least one of said members having a yielding support arranged to permit said opposing faces to conform to each other, substantially as described.

10. A magnetic clutch comprising coacting members having suitable meeting faces, a hub, and a yielding support for one of said members mounted upon said hub, and arranged to permit said meeting faces to conform to each other, substantially as described.

11. In a magnetic clutch, the combination with coacting members having corresponding meeting faces, of a spring-disk supporting one of said members whereby the faces of said members are adapted to conform, substantially as described.

12. In a magnetic clutch, the combination with an armature member, of a magnet member, said magnet member comprising a ring carrying the energizing-coil and having its meeting face corresponding to the opposing face of the armature member, a hub, and a spring-disk supported by said hub and connected to said ring, substantially as described.

13. In a magnetic clutch, the combination with coacting members having corresponding meeting faces normally slightly separated from one another, of a yielding spring-support for at least one of said members arranged when the device is clutched to permit the face of said spring-supported member to conform to the face of the other member and to instantly unclutch the device when the magnet is deënergized, substantially as described.

14. In a magnetic clutch, the combination of an armature member, a magnet member comprising a ring carrying the magnet-coil, a yielding spring-support for said magnet member, arranged to permit the face of said member to conform to the face of the opposite member, collecting-rings suitably connected with said coil, and a brush-support having brushes engaging said rings, substantially as described.

15. A magnetic clutch comprising coacting members having their meeting faces normally spaced apart, at least one of said members suitably supported by a spring-disk whereby said members will be instantly released from each other when the clutch is deënergized.

16. In a magnetic clutch, the combination with coacting members having their meeting faces normally spaced apart, of a spring-disk supporting one of said members, whereby said members will be instantly released from each other when the clutch is deënergized.

17. In a magnetic clutch, the combination with an armature member, of a magnet member, at least one of said members comprising a ring having its meeting face normally spaced apart from the opposing face of the other member, a hub and a spring-disk supported by said hub and connected to said ring.

18. In a magnetic clutch, the combination with an armature member, of a magnet member, at least one of said members comprising a ring having its meeting face normally spaced apart from the opposing face of the other member, a hub having a peripheral flange, a spring-disk secured to said flange and connected to said ring.

19. In a magnetic clutch, the combination with an armature member, of a magnet member, at least one of said members comprising a ring having its meeting face normally spaced apart from the opposing face of the other member, a hub, a spring-disk supported by said hub and connected to said ring, said disk having a central opening to permit it to be slipped over said hub and secured thereto.

20. In a magnetic clutch, the combination with an armature member, of a magnet member, at least one of said members comprising a ring having its meeting face normally spaced apart from the opposing face of the other member, a hub having a peripheral flange, a spring-disk supported by said hub and connected to said ring, said disk having a central opening to permit it to be slipped over said hub and secured to said flange.

21. In a magnetic clutch, the combination with an armature member, of a magnet member, said magnet member comprising a ring carrying the energizing-coil and having its meeting face normally spaced apart from the opposing face of the armature member, a hub and a spring-disk supported by said hub and connected to said ring.

22. In a magnetic clutch, the combination with an armature member, of a magnetic member, said magnet member comprising a ring carrying the energizing-coil, and having its meeting face normally spaced apart from the opposing face of the armature member, a hub and a spring-disk supported by said hub and connected to said ring, said disk having a central opening to permit it to be slipped over said hub and secured thereto.

23. In a magnetic clutch, the combination with an armature member, of a magnet member, said magnet member comprising a ring carrying the energizing-coil and having its meeting face normally spaced apart from the opposing face of the armature member, a hub having a peripheral flange, a spring-disk supported by said hub and connected to said ring, said disk having a central opening to permit it to be slipped over the hub, and secured to said flange.

24. In a magnetic clutch, the combination with a magnet member, of an armature member, a resilient support for at least one of said members for transmitting the power thereof and arranged to permit other than a right-line movement of the same in approaching the other member.

25. A magnetic clutch comprising coacting members having suitable meeting faces, a hub and a yielding support interposed between at least one of said members, and its hub for transmitting the power of said member to the hub and arranged to permit said meeting faces to conform to each other.

26. In a magnetic clutch, the combination with coacting members, of a radial yielding support for at least one of said members.

27. A magnetic clutch comprising coacting members having suitable meeting faces, a hub and a radial yielding support for one of said members mounted upon said hub.

In witness whereof I have hereunto subscribed my name in the presence of two witnesses.

GEORGE A. DAMON.

Witnesses:
BURT S. HARRISON,
W. H. ZIMMERMAN.